July 2, 1968  G. E. GLATTENBERG ETAL  3,390,579

OVER-PRESSURE DIAPHRAGM PROTECTION

Filed Sept. 6, 1966

INVENTORS
GORDON E. GLATTENBERG,
DAVID R. MOWRY
BY

United States Patent Office 3,390,579
Patented July 2, 1968

3,390,579
OVER-PRESSURE DIAPHRAGM PROTECTION
Gordon E. Glattenberg, San Gabriel, and David R. Mowry, Riverside, Calif., assignors to Bourns, Inc., a corporation
Filed Sept. 6, 1966, Ser. No. 577,282
5 Claims. (Cl. 73—410)

ABSTRACT OF THE DISCLOSURE

An arrangement and method for protecting a flexible pressure-sensing diaphragm of a pressure-sensitive instrument against damage when the diaphragm is subjected to excessive pressure. The diaphragm is subjected to a selected pressure somewhat above rated pressure and held in flexed attitude while a hardenable plastic material is injected to fill the space or chamber back of the diaphragm and is hardened in situ to form a movement-limiting stop for the diaphragm, the thus formed stop having a surface conforming exactly to the adjacent surface of the diaphragm when the latter is thereafter subjected to pressure in excess of said selected pressure.

---

In instruments of the noted class, the diaphragms are constructed from formed sheets of thin metal, usually an alloy (possessing a set of requisite characteristics. Commonly also, pressure-sensitive capsules are formed of two similarly shaped circular diaphragms secured together or to an anchor means along their outer peripheries, and each of which is annularly corrugated or similarly deformed to provide improved flexure characteristics. However formed, the diaphragm walls of such a capsule are capable of elastic deformation resulting in expansion and contraction of the capsule in the direction of an axis perpendicuar to the plane of their peripheral juncture. Like any elastic device, such diaphragms, singly or as parts of capsules, are subject to being stressed beyond the elastic limit when loaded excessively. It is known that as excessive overloading occurs, at first only a very small portion or increment of area of the diaphragm material becomes stressed beyond the elastic limit, with but a correspondingly small extent of damage. And it is known that such a small portion of the diaphragm may be thus damaged by overstressing, at a much lower pressure than the increased pressure at which extensive further damage would occur. It is accordingly within the purview of the invention to provide means which will be effective to positively prevent any stressing of any incremental part of the elastic portion of a capsule or diaphragm beyond the elastic limit, irrespective of the extent of the excessive loading.

In the prior art various and sundry types of overpressure "stops" have been provided, some fixed and others of adjustable character, which are disposed in or along the line of travel of a portion of a diaphragm and which act to limit movement of that portion of the elastic member to a prescribed extent. Generally such stops are in the form of adjustable screws or buttons, or adjustable tubular members, so arranged that an end or stop-face of the stop is contacted by a complementary portion of the surface of the diaphragm or capsule as the elastic member is deformed and stressed. Unless severe further increase of translation of the elastic member or diaphragm occurs, only nominal or minor damage is caused by further moderate increase of applied pressure; however, even in those instances in which a large portion of the face area of the translating or bending diaphragm comes into contact with the stop, ruinous permanent deformation of the elastic portion of the diaphragm or capsule is the rule when excessive overloading of the instrument occurs.

It is the purpose of the present invention to positively prevent such ruinous deformation of a deforming diaphragm or of an expanding capsule; and further it is an ancillary purpose to provide individual protective means perfectly matched to the individual pressure-sensitive element which protective means prevents even a very small portion or increment of the elastic portion of the diaphragm or capsule to be stressed beyond the elastic limit even under conditions of gross excessive overloading.

Briefly, the invention comprehends provision of stop means having a stop surface or face which is exactly and completely complementary to the adjacent deforming moving surface of the elastic portion of the diaphragm or capsule when the capsule or diaphragm is subjected to the action of fluid under a prescribed predetermined pressure differential defining a desired upper pressure differential limit. To those ends, the pressure port of the instrument comprising the diaphragm or capsule is subjected to the predetermined (limit) pressure, and the remainder of the cavity within which the diaphragm normally would deform is filled with a special fluid or plastic material which is hardened in situ while the capsule or diaphragm is maintained at the selected desired differential pressure limit. Thus the hardened material, presenting a face exactly conforming to the complementary surface of the diaphragm or capsule when the latter is pressure-stretched to the desired limit, acts upon every incremental portion of the movable elastically deforming surface of the diaphragm, provides a positive stop for every incremental portion of the noted surface, and continues to positively prevent stressing of any increment or portion of the capsule above the elastic limit of the material. Various materials may be employed in forming the protective stops, as will be more fully made evident; and various procedures followed.

The preceding brief description of the invention makes it evident that a principal object of the invention is to provide improvements in overpressure protection for pressure-sensitive diaphragms.

Another object is to provide deformation-limiting means effective to positively restrict deformation of all incremenetal areas of the elastically deformable portions of a diaphragm to a limit below that at which the elastic limit of the diaphragm is exceeded.

Another object of the invention is to provide expansion-limiting means for an elastic expansible capsule, effective to prevent stressing of the capsule above the elastic limit incident to application of excessive pressure differential to the capsule.

Other objects and advantages of the invention are hereinafter set out or made evident in the appended claims and the following detailed description of an exemplary physical embodiment of means according to the invention, the description being in conjunction with the accompanying drawings which are a part of this specification. In the drawings:

Figure 1:
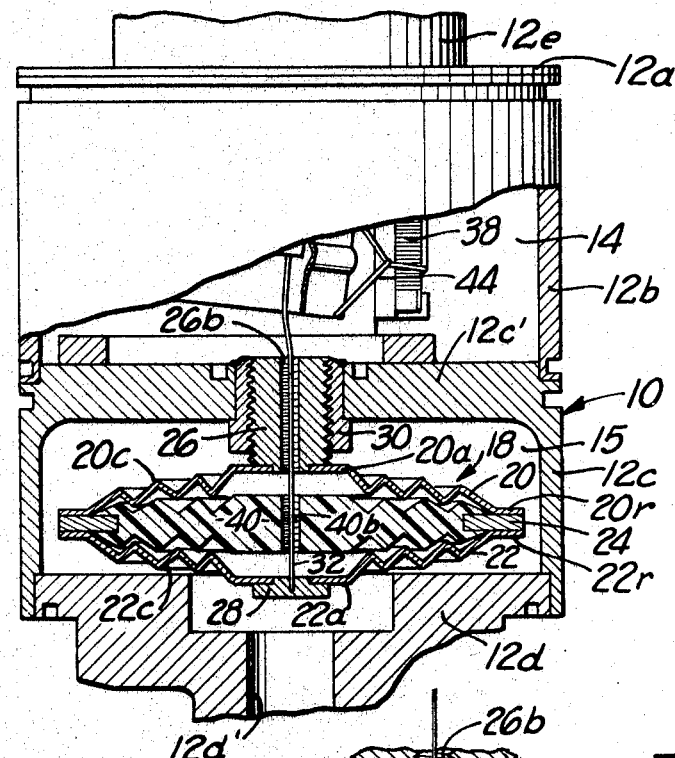
FIGURE 1 is a view in elevation, principally in section, illustrating application of the invention to the pressure-sensitive means of a typical pressure transducer such as that described in U.S. Patent No. 3,173,120.

Referring first to FIGURE 1, there is illustrated a fragment of a pressure transducer of the general type illustrated and fully explained in U.S. Patent No. 3,173,-

120, to which reference may be made for details, the transducer illustrated in FIGURE 1 having a modified form of pressure-sensitive capsule conforming to the present invention. As shown in the drawing the transducer, 10, comprises a structured housing comprising a cup-like base 12c to which is welded a cylinder 12b whose upper end is welded to a cap 12a which carries at its upper end a connector 12e. The base 12c is also welded at its lower periphery to a fitting 12d. The structuring is such that the housing provides an upper chamber 14 and a lower chamber 15, divided by a perforated wall formed by a portion 12c' of base 12c. Upper chamber 14 is utilized to enclose signaling means, the exemplary signaling means, as illustrated in the noted patent, comprising a potentiometer having a wiper 44 operatively associated with a resistance element 38. Lower chamber 15 is employed as a pressure chamber in which is disposed a pressure-differential sensitive means which is mechanically connected to the signaling means.

The exemplary pressure-sensitive means depicted in FIGURE 1 consists essentially of an expansible and contractile capsule denoted generally by number 18 and comprising first and second generally elastic diaphragms 20 and 22 preferably separated by an optional rigid anchor 24. The membranes 20 and 22 have respective annular rim portions 20r, 22r each peripherally integrally united, for example by being welded to corresponding annular face areas of anchor 24. Anchor 24 is preferably a flat annular ring as indicated, but may be a perforate disk, and is rigid to the extent that diametral expansion and/or contraction is negligible. Further, each of the diaphragms of the capsule comprises a respective resilient central portion 20c, 22c, which is corrugated as shown and is adapted to flex elastically. The elastic central portions are of annular configuration and each is bounded at its inner boundary by a respective annular portion 20a, 22a. The portion 20a of diaphragm 20 is in this example secured, as by welding, to an adjustable support 26; and the central aperture in diaphragm 22 is in this example sealed by a transmitter button 28 which is welded to portion 22a. All of the noted welded junctures are made fluid-tight. Support 26 is threaded for adjustable attachment to a complementary internally tapped member 30 which is sealed by weldment in an aperture in base 12c as indicated. When properly adjusted relative to member 30, support 26 may be welded to member 30 along the line of juncture as indicated, to provide a fluid-tight juncture. Support 26 is also provided with a threaded bore 26b, through which extends a transmitter (wire) 32 the lower end of which transmitter is secured to button 28.

Thus it is evident that fluid under the pressure is prevalent in chamber 14. That pressure may, if chamber 14 is evacuated, be a very low pressure; or, alternatively, it may be atmospheric pressure if chamber 14 is open to the atmosphere, or it may be another selected pressure if chamber 14 is sealed with a fluid under the selected pressure confined therein. Also, fluid under pressure is admissible into chamber 15 via a passage 12d' formed in fitting 12. Hence each and both diaphragms of capsule 18 are sensitive to variation in the pressure differential between the pressure exhibited by the fluid in chamber 15 and the pressure exhibited by the fluid in chamber 14, the latter pressure being effective on the inner surfaces of the diaphragms of the capsule, and the former pressure being effective on the exterior surfaces of the diaphragms. The diaphragms and appurtenant structures are so constructed that when assembled to form the capsule and there is no pressure differential between fluids on the inside and on the exterior of the capsule, the diaphragms assume respective neutral positions, for example, those depicted in FIGURES 1 and 2, relative to the anchor means 24. Thus, when fluid under pressure greater than that exhibited within the capsule is admitted into chamber 15, the capsule will elastically contract, and transmitter 32 will move upwardly and effect a change in the signaling means. Thus if chamber 14 is at atmospheric pressure the capsule indicates gage pressure, and if the chamber 14 is evacuated the capsule indicates absolute pressure.

Since diaphragms 20 and 22 are or may be of material that may be quite thin relative to diametral dimensions, and of stiff material, admission into chamber 15 of fluid under pressure sufficiently higher than that for which they are designed may stress one or both of the diaphragms beyond the elastic limit of the material and thus ruin the capsule or so damage it that the signaling means will not thereafter provide accurate signals representative of the pressure differential. To prevent such undesired overstressing of the diaphragms, or either of them, there is according to the invention provided a solid, rigid disc-like stop device having, in this example, first and second opposite faces whose surface configurations are such as to exactly match the respective adjacent inner surfaces of the noted flexible central portions of diaphragms 20 and 22 when the pressure differential is at a selected (limit) value above the maximum value for which the capsule is designed but below a value at which the elastic limit of the diaphragms would be exceeded. The solid stop device, denoted generally by number 40, is preferably composed of an initially plastic or fluid-like material which may be solidified in situ. For example, the device 40 may be of hardened epoxy resin, either pure or with a filler such as asbestos or divided metal, or phenolic resin, or the like.

Figure 2:
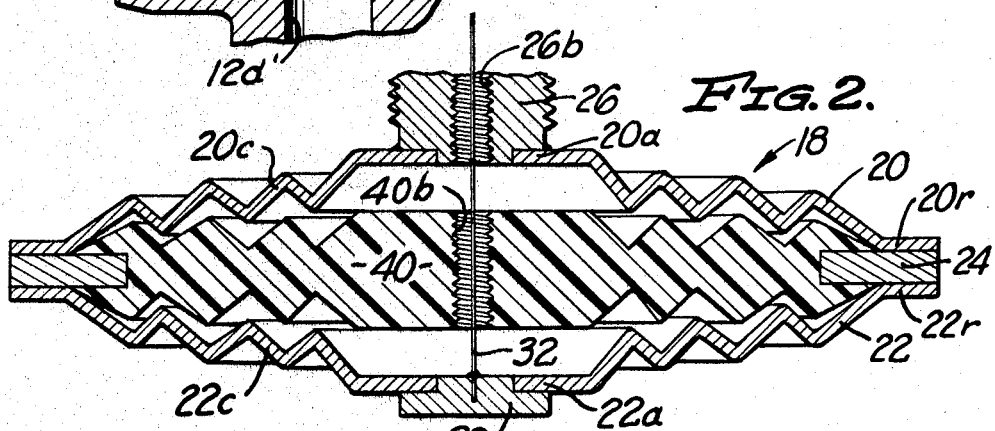
FIGURE 2 is a considerably enlarged cross-sectional view of the pressure-sensitive capsule depicted in section in FIGURE 1, with means according to the invention included.

In forming stop device 40 according to one procedure, the interior surfaces of the capsule are coated with a mold-release agent such as silicone oil, the capsule is subjected to the noted selected limit pressure differential (which may be, for example, 125% of the differential pressure for which the capsule is designed), and a coated, long tubular threaded temporary stop member (not shown) is placed over transmitter wire 32 and turned in part down through tapped bore 26b of support 26 and down into the interior of the capsule and into contact with the interior face of button 28. With the hollow temporary stop in place, in stopping relation to button 20, the hardenable plastic resinous material is forced into the capsule as by way of a hypodermic device, through the hollow temporary stop screw. The latter and the transmitter wire 32 are initially similarly coated with mold-release agent, whereby subsequent removal of the screw is facilitated. The pressure differential is maintained while the resinous material in the capsule hardens; and thereafter the temporary stop screw is removed (breaking off any small interfering portions of the hardened material), and the pressure differential is abolished. The diaphragms elastically move to their neutral positions as depicted in FIGURES 1 and 2, leaving the solid stop device 40 in place firmly affixed to anchor means 24, as the pressure differential is reduced to zero value. Withdrawal of the temporary stop screw leaves bore 26b free and leaves a threaded bore, 40b, through the stop device for free passage of the transmitter wire 32. As is evident, the respective mating surfaces of the elastic central portions of the diaphragms and stop device 40 are thus such as to exactly conform each to another, that is, to be exactly complementary each to the other when the capsule is subjected to the selected limit pressure differential. Since the latter pressure differential is above the pressure differential range for which the capsule is designed, the capsule can operate over its entire design range without any adverse effect or influence from the stop device 40. Also, since the selected limit pressure differential value is below that value at which any portion of either diaphragm would be stressed beyond the elastic limit, it is evident that when the capsule is subjected to pressure differential of value in excess of the selected limit pressure differential, the diaphragms are merely brought into face-to-face contact with the stop device and held there harmlessly until the excessive pressure is relieved. Also it is evident that irrespective of the extent of application of excessive pressure differential, each diaphragm is backed-up and protected over each incremental area of the entire central elastic area thereof by the stop device, and is accordingly saved from any harm by the excess of pressure.

As will be evident to those skilled in the pertinent art or arts, the liquid or plastic resinous material or the like could as well be introduced through a radial bore formed through anchor 24 or through button 28, via a flexible pressure-resistant tube or hypodermic means. The mode of injection or introduction of the material from which device 40 is formed is not, per se, of the present invention, and can be varied to suit other circumstances of manufacture of devices or instruments in which the capsule or diaphragms are to be used.

Figure 3:
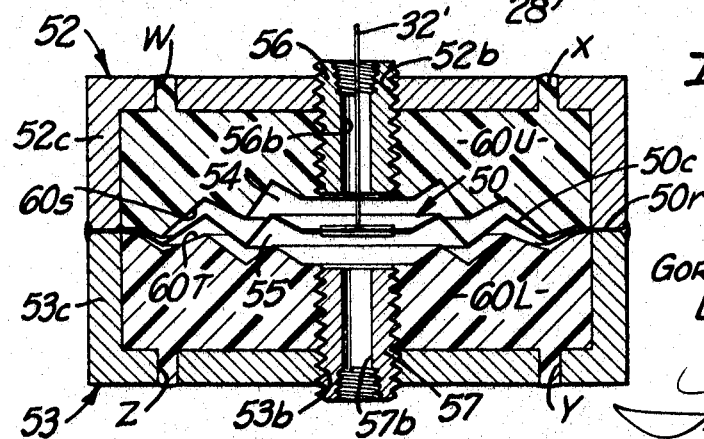
FIGURE 3 is a partly schematic cross-sectional view of a single-diaphragm pressure-sensitive device with an elastic diaphragm arranged to sense differential pressure exhibited by pressures of fluids applied to opposite faces of the diaphragm, with means according to the invention.

Referring now to FIGURE 3, there is somewhat schematically illustrated the application of means according to the invention to a pressure-sensor in the form of a single elastic diaphragm arranged to sense differences between the pressures exhibited by first and second fluids admitted to opposite faces of the diaphragm. The diaphragm, 50, comprises a central elastic portion 50c encircled by a peripheral rim portion 50r which is firmly clamped between and integrally united, as by welding, with rigid anchor means in the form of cylindrical portions 52c, 53c of complementary cup-shaped pressure transducer housing members 52 and 53. The housing structure thus formed by the integrally-united members 52 and 54 provides a substantially enclosed cavity which is divided by diaphragm 50 into upper and lower chambers 54 and 55. Each of the cup-like members 52 and 53 is made with a respective tapped centrally-disposed bore, 52b, 53b, adapted to receive a respective one of complementary threaded adjustable stops 56 and 57. Further, each of members 52 and 53 is provided with small bores, such as those denoted W, X, Y and Z, to permit introduction and egress of a fluid or plastic resinous material into the chambers above and below the diaphragm. Adjustable stop 56 is provided with a bore 56b the outer end of which may be tapped as indicated, for connection to a conduit or complementary fitting; and stop 57 is similarly provided with a bore 57b the outer end of which is similarly tapped for connection to a conduit.

Continuing with reference to FIGURE 3, it will be noted that diaphragm 50 is designed for operation over a specified range of pressure differentials, and has secured to it at its center a transmitter rod or wire 32' which extends outside the housing by way of the bore through stop 56. The transmitter serves to transmit displacements of the center portion of the diaphragm to means for utilization of such displacements. For example, such means may be potentiometer means such as are explained in the aforementioned patent. A first fluid under a pressure P1 may be admitted to chamber 54 via bore 56b; and similarly a second fluid under a pressure P2 may be admitted to chamber 55 by way of bore 57b. When pressures P1 and P2 are equal the diaphragm 50 assumes a neutral position such as that illustrated. As is evident, if P1>P2 the diaphragm is elastically displaced downwardly, and if P1<P2, the diaphragm is displaced upwardly. Means according to the invention are provided to restrict translations or deformations of the elastic central portion of the diaphragm to values below those at which any portion of the diaphragm would be stressed beyond the elastic limit. Thus means are provided which prevents further translation of the diaphragm in the same direction after a selected limit pressure differential P1−P2, or P2−P1, has been reached. Such a selected pressure differential limit may be, for example, 125% of the upper pressure differential for which the diaphragm is designed for operation.

The noted means for preventing excessive translation or elastic deformation of the diaphragm 50 comprise upper and lower shaped solid stop members 60U and 60L, formed of hardened-in situ plastic material such as metal-filled synthetic resin or the like. Stop member 60U is formed by introducing fluid under pressure via bore 57b into chamber 55 until the noted selected desired maximum or limit pressure differential P2−P1 is reached, turning adjustable stop 56 inwardly into contact with the upwardly deflected diaphragm, filling the reduced chamber 55 above the diaphragm with the plastic material via one of the bores W, X, curing the plastic material, and relieving the pressure differential. Stop member 60L is formed in an analogous and similar way using member 57 as a temporary center stop device. As in the previously explained case, a mold-release agent is preferably used to insure easy and perfect separation of the diaphragm from the stop members or devices. 60U and 60L. Following casting of stop devices 60U and 60L in situ, members 56 and 57 may be sealed to cups 52 and 53 by bead welding, if desired.

As has now been made evident, the surface 60S of the upper stop device exactly matches the upper surface of diaphragm 50 when the latter is subjected to the noted selected limit pressure differential P2−P1. Similarly, the surface 60T of the lower stop device 60L exactly matches the mating lower surface of diaphragm 50 when the latter is elastically deformed downwardly under the noted selected limit pressure differential P1−P2. Following formation in situ of stop devices 60U and 60L, the structure may be subjected to gross overpressure in either direction without harmful effects on the diaphragm 50, since every incremental area of the entire elastic portion of the latter is firmly backed up by a complementary solid stop device in either direction of translation.

The preceding detailed description of preferred exemplary means according to the invention makes it evident that the aforementioned objects have been fully attained. The stop device as explained is inexpensive, extremely effective, and provides a meritorious and novel advance in the art. Every increment of the elastic portion of the diaphragm is in all cases provided with a solid stop surface for support against excessive pressure, whereby even extremely thin and weak diaphragms are protected against rupture or ruinous deformation in operation.

In the light of the present disclosure changes and modifications within the true spirit and scope of the invention will occur to those skilled in the art, and accordingly it is not desired to restrict the scope of the invention to exact details of the illustrated exemplary embodiment or embodiments.

We claim:

1. An improvement in pressure-sensing means, comprising:

first means, including a diaphragm having opposite exposed faces and having an elastic central portion arranged to be subjected at the said faces to respective fluids under pressure and adapted to flex from a neutral position assumed when said fluids are under like pressures to a limit position assumed when the differential between the pressures of said fluids is a selected desired maximum differential;

second means, including anchor means for anchoring said diaphragm around the periphery of said central portion whereby only said central portion may elastically flex under the influence of a said differential between pressures exhibited at said opposite faces;

third means, including solid means fixed relative to said anchor means, which solid means has a surface exactly and completely complementary and conforming to the surface configuration of the adjacent one of said exposed faces when the said diaphragm is flexed to said limit position;

whereby said third means provides an effective stop for each incremental area of all elastically flexed portions of said diaphragm to prevent further flexing of any thereof incident to further increase of said differential above said maximum permissible differential.

2. The improvement defined in claim 1, in which said anchor means is constituted by a member having an annular rim presenting opposed surfaces and to which rim an annular rim portion of said diaphragm is affixed.

3. The improvement defined in claim 2, in which said diaphragm is accompanied by a similar second diaphragm opposing said first mentioned diaphragm, said second diaphragm being similarly secured to said anchor means, and in which said solid means is secured to said anchor means and is confined between said diaphragms and comprises a second surface similarly exactly and completely conforming to the surface configuration of the adjacent face of said second diaphragm when the second diaphragm is similarly flexed to a corresponding limit position under the influence of said selected desired maximum differential of pressure.

4. A method of providing protection against application of pressure differential in excess of a selected desired maximum pressure differential to a pressure-sensitive diaphragm having an exposed elastic portion and anchored to an anchor means forming a diaphragm support, said method comprising:

applying mold-release agent to a face of said elastic portion of the diaphragm;

subjecting the diaphragm to said selected desired maximum pressure differential to elastically deform in a selected direction said elastic portion with said face subjected to tension below the elastic limit of the diaphragm;

maintaining said pressure differential while applying over said face and in contact with said anchor means a hardenable mass of initially plastic material and hardening said mass to form in situ an anchored rigid block of hardened material having a surface completely complementary to the face of said elastic portion of said diaphragm;

and reducing said pressure differential to which said diaphragm is subjected, to permit said face of the diaphragm to part from said surface, whereby to leave in fixed position relative to said anchor means a rigid mass having a surface effective to arrest elastic deformation of said diaphragm in said direction below said elastic limit.

5. A method of protecting the elastic portion of a pressure-sensitive diaphragm device against deformation in excess of a selected maximum extent in a selected direction incident to application to the diaphragm device of a pressure differential of a selected value producing force acting to elastically deform the elastic portion of the diaphragm in that direction and produce tensile stress in the surface of the elastic portion of the diaphragm device facing in that direction, said method comprising:

providing anchor means and a diaphragm having a peripheral rim portion peripherally secured to the anchor means, the diaphragm having a circular elastic portion having a front surface facing in said direction and subject to elastic deformation in said direction incident to application thereto of force in said direction as a result of application thereto of a pressure differential tending to move the diaphragm in said direction;

subjecting the diaphragm device to force such as to cause the elastic portion thereof to deform to said selected maximum extent in said direction and temporarily maintaining said portion in the deformed attitude;

introducing over the entire front surface of said elastic portion of said diaphragm and into anchoring relation with said anchor means a mass of hardenable plastic material to provide a surface of said plastic material exactly complementary to said front surface and permitting said mass to harden into a rigid mass while so temporarily maintaining said elastic portion of the diaphragm device in the deformed attitude;

thereafter reducing the magnitude of said force to permit said front surface to part from and recede away from the exactly complementary surface of the anchored rigid mass of hardened material;

whereby there is provided an anchored, rigid deformation-limiting stop surface disposed to be engaged by each incremental area of said front surface of the elastic portion of said diaphragm device during elastic deformation thereof incident to deformation to said selected maximum extent and further disposed and arranged to prevent further deformation of said elastic portion in said direction to protect the diaphragm device against any such excess of deformation incident to increase of said pressure differential above said value.

References Cited

UNITED STATES PATENTS

| | | | |
|---|---|---|---|
| 2,841,894 | 7/1958 | Green | 73—406 |
| 2,879,802 | 3/1959 | Du Bois | 92—97 |

FOREIGN PATENTS 388,514  3/1933  Great Britain.

S. CLEMENT SWISHER, *Acting Primary Examiner.*

LOUIS R. PRINCE, DAVID SCHONBERG, *Examiners.*

DENIS E. CORR, *Assistant Examiner.*